US008125995B2

(12) United States Patent
Zhang

(10) Patent No.: US 8,125,995 B2
(45) Date of Patent: Feb. 28, 2012

(54) METHOD AND SYSTEM FOR IMPLEMENTING DYNAMIC SIGNALING ROUTING

(75) Inventor: Rui Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1245 days.

(21) Appl. No.: 11/821,113

(22) Filed: Jun. 21, 2007

(65) Prior Publication Data

US 2009/0086715 A1 Apr. 2, 2009

Related U.S. Application Data

(63) Continuation of application No. PCT/CN2006/002018, filed on Aug. 10, 2006.

(30) Foreign Application Priority Data

Aug. 25, 2005 (CN) .......................... 2005 1 0093052

(51) Int. Cl.
*H04L 12/28* (2006.01)

(52) U.S. Cl. ................................. 370/395.32

(58) Field of Classification Search .................. None
See application file for complete search history.

(56) References Cited

U.S. PATENT DOCUMENTS 6,006,258 A * 12/1999 Kalajan .................... 709/219
(Continued)

FOREIGN PATENT DOCUMENTS

CN    1595887    3/2005
(Continued)

OTHER PUBLICATIONS

English abstract of CN 1595887 dated Mar. 16, 2005.
(Continued)

*Primary Examiner* — Chirag Shah
*Assistant Examiner* — Jenkey Van
(74) *Attorney, Agent, or Firm* — Slater & Matsil, L.L.P.

(57) ABSTRACT

A method for implementing dynamic signaling routing includes: A. sending a register request from a Terminal Element (TE) to Service Elements (SEs) via a Network Element (NE); B. upon receiving the register request, determining one of the SEs which will provide signaling service for the TE in accordance with association information recorded in the NE. Further, a system for implementing dynamic signaling routing, comprising: Service Elements (SEs), for providing signaling service; Terminal Elements (TEs), for sending register requests to the SEs; and Network Elements (NEs), between the TEs and the SEs, for determining one of the SEs which has provided signaling service for the TE in accordance with association information recorded in the NEs upon receiving the register request.

12 Claims, 3 Drawing Sheets

U.S. PATENT DOCUMENTS

| | | | |
|---|---|---|---|
| 6,148,410 A * | 11/2000 | Baskey et al. | 714/4.11 |
| 6,735,441 B1 | 5/2004 | Turgeon et al. | |
| 6,754,219 B1 * | 6/2004 | Cain et al. | 370/401 |
| 6,782,422 B1 * | 8/2004 | Bahl et al. | 709/224 |
| 2002/0118686 A1 * | 8/2002 | Gupta | 370/401 |

FOREIGN PATENT DOCUMENTS

| | | |
|---|---|---|
| CN | 1011601011 A | 4/2008 |
| EP | 1 235 409 A2 | 8/2002 |
| EP | 1 235 409 A3 | 6/2005 |
| FR | 2856550 | 12/2004 |
| KR | 20040009118 | 1/2004 |

OTHER PUBLICATIONS

English abstract of FR 2856550 dated Dec. 24, 2004.
English abstract of KR 20040009118 dated Jan. 31, 2004.
Abstract of CN101161011.
J. Hardwick, "Session Border Controllers—Enabling the VoIP Revolution", Data Connection Ltd., URL:http://www.dataconnection.com/network/download/whitepapers/sessionbordercontroller.pdf, p. 1-51, Feb. 2005.

* cited by examiner

METHOD AND SYSTEM FOR IMPLEMENTING DYNAMIC SIGNALING ROUTING

CROSS-REFERENCE TO RELATED APPLICATIONS

The present application is a continuation application of PCT application No. PCT/CN2006/002018, filed Aug. 10, 2006, which claims priority of Chinese application No. 200510093052.9.

FIELD OF THE INVENTION

The present invention relates to communications, particularly to a method for implementing dynamic signaling routing.

BACKGROUND OF THE INVENTION

With the popularity of Internet Protocol (IP) technique, a Next Generation Network (NGN) has been widely applied, which uses an IP network as a bearer network.

A basic architecture of existing NGN is shown in FIG. 1. The NGN includes a soft switch, various terminals and gateways. The soft switch, as a core device in NGN, is used for translation between signal address and IP address, translation between different signals, and management of subscribers. The terminal is used to register signal address and IP address with the soft switch, initiate and receive calls, and code/decode audio and video data. Viewed from the mechanism, the gateways have the same function as the terminal, including registration, call, and audio-video codec function, etc. The gateways differ from the terminals in that they have larger capacity and better performance, and mainly used for inter-communication between NGN and conventional PSTN.

It can be seen from FIG. 1 that the soft switch, which is the core device of NGN, is directly connected with the terminal via IP bearer network, that is to say, the NGN is a network with a "flat" architecture. The flat network architecture is adaptable at the early stage of NGN development since the NGN has a small scale and is used for trial, which has less strict requirements of network performances, such as security, reliability, etc. However, with the commercialization of NGN, the flat network architecture shows some disadvantages as follows:

1. Network Address Translation (NAT) technique is widely used due to lack of IP addresses. However, NGN terminal subscribers under NAT can not access the NGN core network directly.

2. Increasing attacks, especially signaling attacks, in the IP bearer network, bring serious threat to the NGN core network.

3. An obvious difference of the NGN from the conventional PSTN is that signaling is processed separately from media. Signaling streams are processed through the soft switch but media streams are not, which can result in bandwidth stealing.

In view of above, a Session Border Controller (SBC) device is introduced in the NGN, as shown in FIG. 2. The SBC device functions as both signaling proxy and media proxy. For the terminal, the SBC device serves as the soft switch. For the soft switch, the SBC device serves as the terminal. In this way, the NGN core network is separated from the subscriber access network to assure the security of the NGN core network. Upon introduction of the SBC device, the SBC device serves as the proxy of all media streams of all terminals, which can solve the problem of bandwidth stealing.

In order to ensure high availability of NGN, there are usually two soft switches configured in the NGN core network, which serve as a backup of each other. The terminal supports a "dual homing" function. By configuring addresses of primary and standby soft switches, continuity of terminal traffics will not be affected if one of the soft switches fails. However, a new problem arises with the introduction of SBC device. The SBC device is connected between the NGN core network and the subscriber access network, so a large amount of traffics of the terminal subscriber will be interrupted in case of failure of the SBC device. Therefore, it is necessary to configure a backup for the SBC device.

A preferred embodiment is shown in FIG. 3.

Both terminal A and terminal B support the dual homing function. During normal operation, the soft switch works in a load sharing mode. Terminal A registers with the soft switch through device SBC-A and terminal B registers with the soft switch through device SBC-B.

Under ideal condition, if soft switch A fails, terminal A can detect the failure of soft switch A and register with soft switch B through device SBC-B. In addition, soft switch B can detect the failure of soft switch A and take over the traffics of soft switch A, so that the traffic continuity is ensured.

However, if device SBC-A as shown in FIG. 3 fails, terminal A will register with soft switch B through device SBC-B since soft switch A is unreachable, but soft switch B will not take over the traffics of soft switch A and will thus reject the register request because soft switch B does not detect the failure of soft switch A, which results in traffic interruption. This embodiment just shows one case that the introduction of SBC device results in a single-point failure. There will be various single-point failures in the case of concatenation of multiple SBC devices. The above is resulted from that the SBC device can not support dynamic signaling routing.

SUMMARY OF THE INVENTION

In view of above, the present invention provides a method for implementing dynamic signaling routing. With this method, existing SBC devices are enabled to support dynamic signal routing, thus disaster recovery ability of NGN can be improved and thereby reliability of the NGN can be improved.

A method for implementing dynamic signaling routing according to the present invention includes:

A. sending a register request from a Terminal Element (TE) to Service Elements (SEs) via a Network Element (NE);

B. upon receiving the register request, determining one of the SEs which will provide signaling service for the TE in accordance with association information recorded in the NE.

The association information includes:

association information between neighboring SEs and the TE for which signaling service is provided, and/or association information between neighboring NEs and the TE for which signaling transfer service is provided.

The association information includes:

association information between the NE and SEs to which the NE requests signaling service, and/or association information between the NE and NEs to which the NE requests signaling transfer service.

The step B includes:

B1. searching, by the NE, in the association information between the NE and SEs to which the NE requests signaling service, for the SE which has provided signaling service for the TE; if an SE which has provided signaling service for the TE is searched out, determining the SE which has provided signaling service for the TE as an SE which will provide signaling service for the TE;

B2. forwarding the register request to the determined SE, and going to the end;

or

B3. searching, by the NE, in the association information between neighboring NEs and the TE for which signaling transfer service is provided, for a neighboring NE which has provided signaling transfer service for the TE; if a neighboring NE which has provided signaling transfer service for the TE is searched out, determining the neighboring NE which has provided signaling transfer service for the TE as a neighboring NE which will provide signaling transfer service for the TE;

B4. forwarding the register request to a corresponding SE via the determined neighboring NE, and going to the end;

or

B5. searching, by the NE, in the association information between the NE and SEs to which the NE requests signaling service, for an SE which has provided signaling service for the TE; if an SE which has provided signaling service for the TE is searched out, determining the SE which has provided signaling service for the TE as an SE which will provide signaling service for the TE, and going to step B6; otherwise, going to step B7;

B6. forwarding the register request from the TE to the determined SE, and going to the end;

B7. searching, by the NE, in the association information between neighboring NEs and the TE for which signaling transfer service is provided, for a neighboring NE which has provided signaling transfer service for the TE; if a neighboring NE which has provided signaling transfer service for the TE is searched out, determining the neighboring NE which has provided signaling transfer service for the TE as a neighboring NE which will provide signaling transfer service for the TE, and going to step B8; otherwise, ending the search;

B8. forwarding the register request from the TE to a corresponding SE via the determined neighboring NE, and going to the end.

Before the step B1, B3 or B5, the method further includes:

B01. in accordance with TE ID in the register request, searching, by the NE, in the association information between neighboring SEs and the TE for which signaling service is provided, for a neighboring SE which has provided signaling service for the TE; if a neighboring SE which has provided signaling service for the TE is searched out, determining the neighboring SE which has provided signaling service for the TE as a neighboring SE which will provide signaling service for the TE; and going to step B02; otherwise, going to step B1, B3, or B5;

B02. sending the register request to the determined neighboring SE, and going to the end;

or

B03. in accordance with TE ID in the register request, searching, by the NE, in the association information between neighboring NEs and the TE for which signaling transfer service is provided, for a neighboring NE which has provided signaling transfer service for the TE; if a neighboring NE which has provided signaling transfer service for the TE is searched out, determining the neighboring NE which has provided signaling transfer service for the TE as a neighboring NE which will provide signaling transfer service for the TE, and going to step B04; otherwise, going to step B1, B3, or B5;

B04. forwarding the register request to the corresponding SE via the determined neighboring NE, and going to the end;

or

B05. in accordance with the TE ID in the register request, searching, by the NE, in the association information between neighboring SEs and the TE for which signaling service is provided, for a neighboring SE which has provided signaling service for the TE; if a neighboring SE which has provided signaling service for the TE is searched out, determining the neighboring SE which has provided signaling service for the TE as a neighboring SE which will provide signaling service for the TE, and going to step B06; otherwise, going to step B07;

B06. sending the register request to the determined neighboring SE, and going to the end;

B07. in accordance with TE ID in the register request, searching, by the NE, in the association information between neighboring NEs and the TE for which signaling transfer service is provided, for a neighboring NE which has provided signaling transfer service for the TE; if a neighboring NE which has provided signaling transfer service for the TE is searched out, determining the neighboring NE which has provided signaling transfer service for the TE, and going to step B08; otherwise, going to step B1, B3, or B5;

B08. forwarding the register request to the determined neighboring NE, sending the register request to the corresponding SE via the determined neighboring NE, and going to the end.

The step B2, step B6, step B02, or step B06 includes:

B21. if the number of the determined SE or the determined neighboring SE which has provided signaling service for the TE is at least two, selecting the SE with the largest weight to provide signaling service for the TE;

B22. forwarding the register request to the selected SE, and going to the end.

The process of forwarding the register request to the corresponding SE via the determined neighboring NE in the step B4 or B8 includes:

B41. if the number of the determined neighboring NE which has provided signaling transfer service for the TE is at least two, selecting the neighboring NE with the largest weight to provide signaling transfer service for the TE;

B42. forwarding the register request to the corresponding SE via the selected neighboring NE.

In the step B2 or step B6, before going to the end, the method further includes:

creating routing information between the NE and the determined SE, and adding the routing information to the association information between the NE and SEs to which the NE request signaling service.

In the step B4 or step B8, before going to the end, the method further includes:

creating routing information between the TE and the determined neighboring NE which has provided signaling transfer service for the TE, and adding the routing information to the association information between neighboring NEs and the TE for which signaling transfer service is provided.

The method further includes:

storing the association information between the NE and SEs to which the NE requests signaling service in a neighboring SE list, storing the association information between the NE and NEs to which the NE requests signaling transfer service in a neighboring NE list, storing the association information between neighboring SEs and the TE for which signaling service is provided in an SE service list, and/or storing the association information between neighboring NEs and the TE for which signaling transfer service is provided in an NE service list.

Between the step A and step B, the method further includes:

C1. if the NE detects interruption of the register signaling, deleting routing information of the interruption from the SE service list and/or the NE service list recorded in the NE, and sending the updated list information to the neighboring NEs connected to the NE;

C2. updating, by the neighboring NE, information in SE service list and/or NE service list recorded in the neighboring NE in accordance with the updated list information.

In the method, the information in the SE service list and/or NE service list recorded in the NE is sent from the NE to the neighboring NEs connected to the NE periodically.

The present invention further provides a system for implementing dynamic signaling routing, comprising: Service Elements (SEs), for providing signaling service; Terminal Elements (TEs), for sending register requests to the SEs; and Network Elements (NEs), between the TEs and the SEs, for determining one of the SEs which has provided signaling service for the TE in accordance with association information recorded in the NEs upon receiving the register request.

With embodiments of the present invention, reliability of the NGN can be improved. Certain embodiments of the invention may include one, some, or all of the above technical advantages. One or more other technical advantages may be readily apparent to one skilled in the art from the figures, description, and claims included herein.

DETAILED DESCRIPTION OF THE INVENTION

Figure 1:
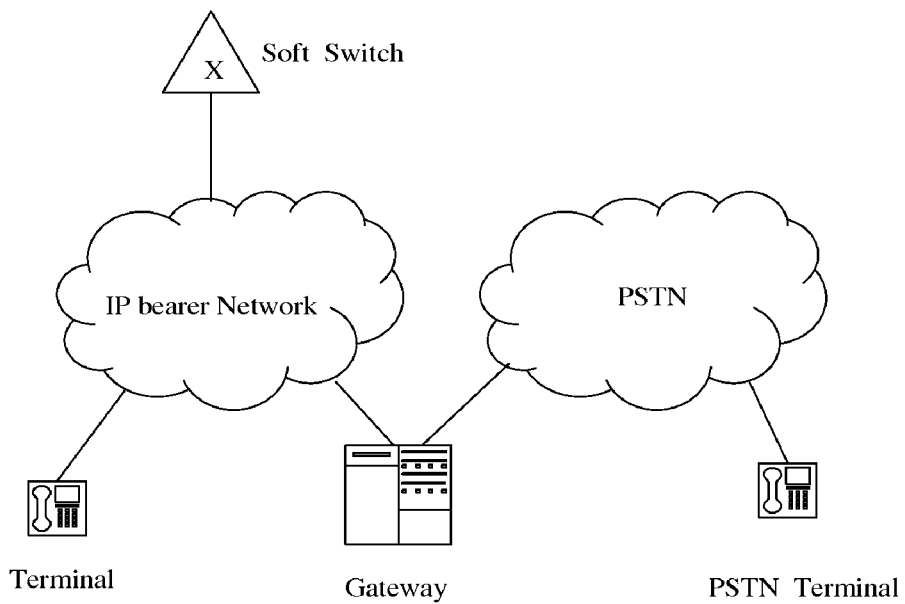
FIG. 1 is a schematic diagram illustrating basic architecture of an NGN.
Figure 2:
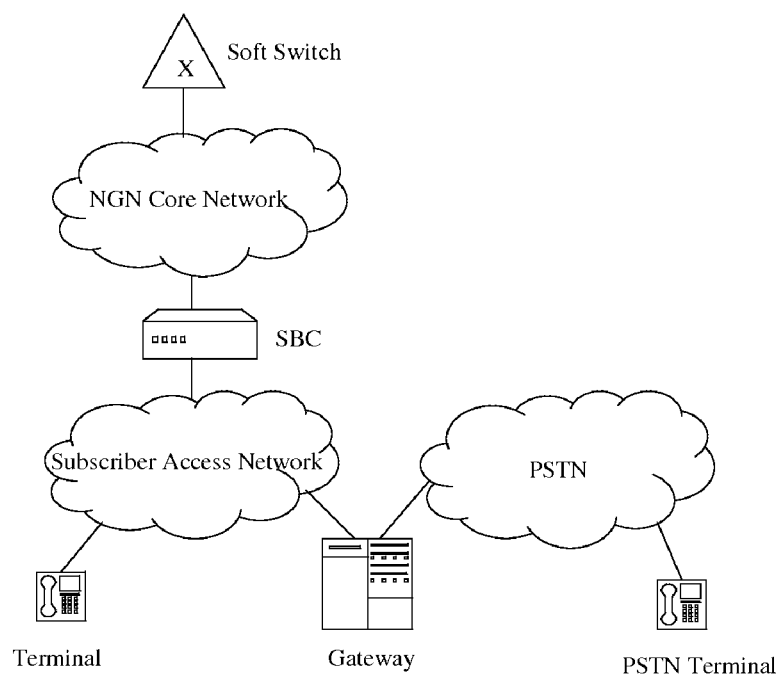
FIG. 2 is a schematic diagram illustrating architecture of an NGN including an introduced SBC device.
Figure 3:
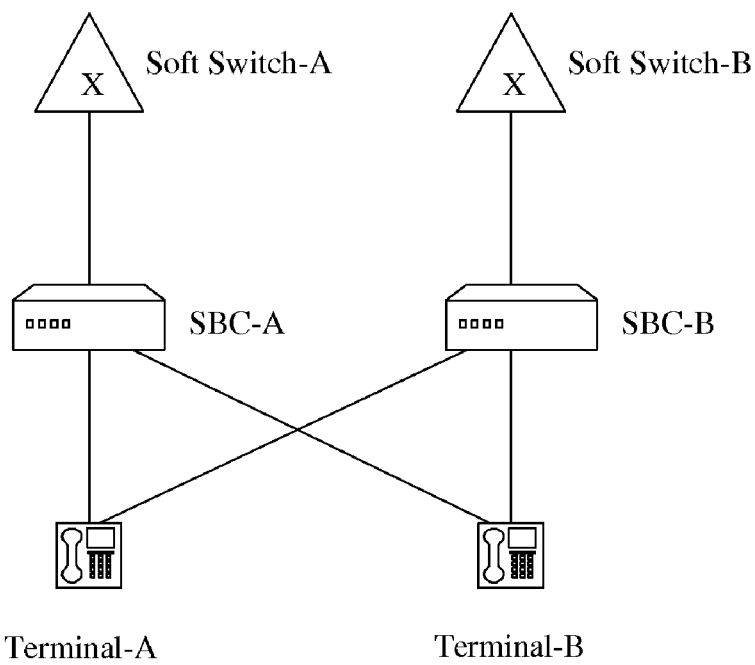
FIG. 3 is a schematic diagram illustrating architecture of a dual homing NGN.

The present invention provides a method for improving network reliability by implementing dynamic signaling routing. In the method, a Terminal Element (TE) sends a register request to Service Elements (SEs) via a Network Element (NE); after receiving the register request from the TE, the NE determines one of the SEs which will provide the TE with signaling service according to association information recorded in the NE.

The technical solution according to the present invention may be implemented in an SBC device, but not limited to dedicated SBC device (the SBC may be given other names by some organization and institution, for example, SAC by China Unicom, and BAC by China Telecom). The method may also be implemented in other devices with ability of signaling processing and signaling transfer.

For convenience, devices in an NGN are abstracted as the following three network elements:

1. SE: Service Element, mainly referring to a network device providing signaling service, such as soft switch, GK, etc.

2. NE: Network Element, referring to a device with dynamic signaling routing processing ability, usually an SBC device (it may be also a soft switch, an IP router or an access device with signaling processing ability).

3. TE: Terminal Element, mainly referring to a terminal device such as a terminal or a gateway device.

In order to ensure that terminals and soft switches in the existing network can run normally, the method implements dynamic signaling routing only in NE device. The SE and TE exchange information with the NE by using standard signaling protocols.

The following lists are set up and maintained before implementation of the method according to the present invention, so as to store information for improving network reliability by implementing dynamic signaling routing:

1. Neighboring SE list, which is used to store information on which SE an NE requests to provide signaling service, i.e., association information between the NE and the SE to which the NE requests signaling service. Contents in this list include SE ID, signaling type, weight, IP address and port of the SE.

2. Neighboring NE list, which is used to save information on which NE an NE requests to provide signaling transfer service, i.e., association information between the NE and an NE to which the NE requests signaling transfer service. Contents in this list include NE ID, signaling type, weight, IP address and port of the requested NE.

3. SE service list, which is used to store information on which TE a neighboring SE has provided signaling service for, i.e., association information between the neighboring SE and the TE for which signaling service is provided. Contents in this list include SE ID, TE ID and IP address of the TE.

4. NE service list, which is used to store information on which TE a neighboring NE has provided signaling transfer service for, i.e., association information between the neighboring NE and the TE for which signaling transfer service is provided. Contents in this list include NE ID, TE ID and IP address of the TE.

The above neighboring SE list and neighboring NE list are both static and pre-configured.

The SE service list and the NE service list are both dynamic lists and can be updated dynamically. During maintenance of the SE service list and/or the NE service list, the NE periodically sends information in the SE service list and/or NE service list stored in the NE to a neighboring NE connected to the NE. The neighboring NE receives the information and updates information in SE service list and/or NE service list stored in the neighboring NE in accordance with the received information.

Or,

When detecting interruption of a register signaling, the NE deletes corresponding routing information of the interruption from SE service list and/or NE service list stored in the NE, and sends the updated list information to a neighboring NE connected to the NE. The neighboring NE updates information in SE service list and/or NE service list stored in the neighboring NE in accordance with the information.

Or,

When receiving a register request from the TE, the NE updates SE service list and/or NE service list by implementing a dynamic signaling routing flow.

Figure 4:
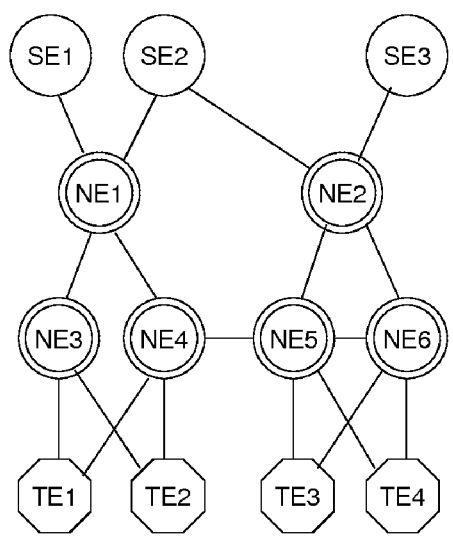
FIG. 4 is a schematic diagram illustrating architecture of a system with higher network reliability according to the present invention.

FIG. 4 is a schematic diagram illustrating relation of three elements according to the present invention, from which it can be seen that a neighboring SE list in network element NE1 includes two items SE1 and SE2; a neighboring NE list in network elements NE3 and NE4 is a neighboring NE1 list; a terminal element TE1 takes network element NE3 as a primary network element, and a network element NE4 as a standby network element.

To initiate a registration, the terminal element TE1 sends a register request to the primary network element NE3. Upon receiving the register request, the network element NE3 searches in an SE service list and an NE service list, with both results null, then the NE3 searches in a neighboring SE list and a neighboring NE list. If the network element NE1 is searched out in the neighboring NE list, the network element NE3 forwards the register request to network element NE1 for processing, and updates the NE service list.

After receiving the register request from the network element NE3, the network element NE1 searches in an SE service list and an NE service list, with both results null, and then network element NE1 searches in a neighboring SE list and a neighboring NE list. If a service element SE1 and a service element SE2 are searched out in the neighboring SE list, the network element NE1 sends the register request to the service element SE1 and the service element SE2. Upon receiving register responses from the service element SE1 and the service element SE2, the network element NE1 selects the service element SE1 as a primary service element in accordance with weights configured in the neighboring SE service list, and updates the SE service list.

In this way, subsequent signaling messages sent from the terminal element TE1 can be directly forwarded to the service element SE1 in accordance with the NE service list in the network element NE3 and the SE service list in the network element NE1.

In case of failure of the network element NE1, the network element NE3 and the network element NE4 marks NE1 in the NE neighboring list as "unavailable" due to not receiving a refresh message periodically sent from the network element NE1. Therefore, signaling messages from the terminal element TE1 will be transferred to the service element SE2 via NE4->NE5->NE2 for processing to assure the system availability.

Figure 5:
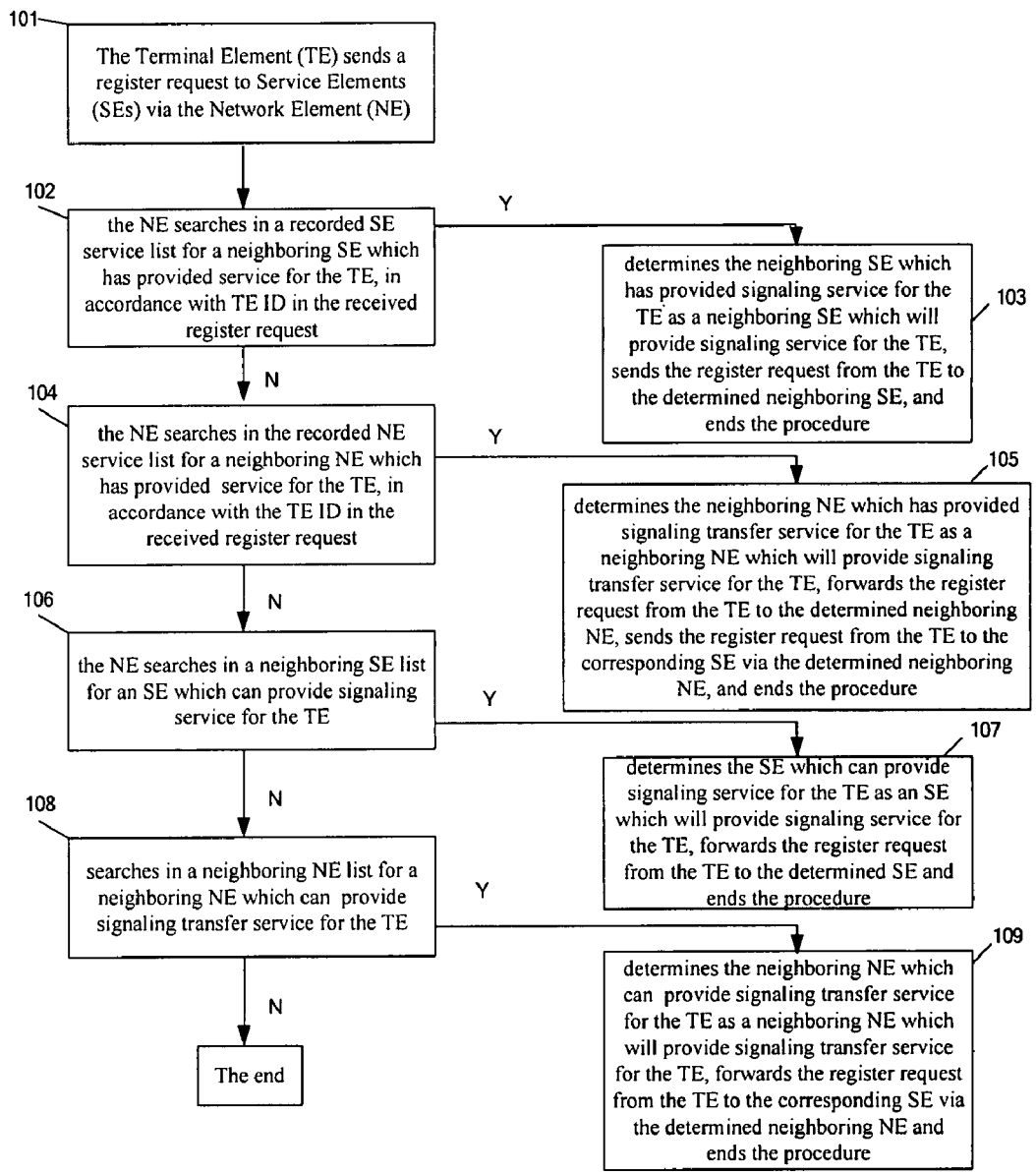
FIG. 5 is a flow diagram illustrating a first embodiment of the method for implementing dynamic signaling routing.

In a first embodiment of the present invention, upon receiving a register request sent from a TE, an NE searches in a SE service list and an NE service list as recorded to determine if corresponding SE and NE have ever provided service for the TE, in accordance with TE ID in the register request. If no corresponding SE or NE is searched out, the NE searches for service route in the neighboring SE list and the neighboring NE list. A specific implementing procedure is shown in FIG. 5, in which:

In step 101, a Terminal Element (TE) sends a register request to a Service Element (SE) via a Network Element (NE).

In step 102, the NE searches in a recorded SE service list for a neighboring SE which has provided service for the TE, in accordance with TE ID in the received register request. If a neighboring SE which has provided service for the TE is searched out, the procedure goes to step 103, i.e., determines the neighboring SE which has provided signaling service for the TE as a neighboring SE which will provide signaling service for the TE, sends the register request from the TE to the determined neighboring SE, and ends the procedure. Otherwise, the procedure goes to step 104.

If the number of the determined neighboring SE in step 103 is at least two, step 103 includes: in accordance with weights of the determined SEs, selecting the SE with the largest weight to provide signaling service for the TE, forwarding the register request from the TE to the selected SE and ending the procedure.

In step 104, the NE searches in the recorded NE service list for a neighboring NE which has provided signaling transfer service for the TE, in accordance with the TE ID in the received register request. If a neighboring NE which has provided signaling transfer service for the TE is searched out, the procedure goes to step 105, i.e., determines the neighboring NE which has provided signaling transfer service for the TE as a neighboring NE which will provide signaling transfer service for the TE, forwards the register request from the TE to the determined neighboring NE, sends the register request from the TE to the corresponding SE via the determined neighboring NE, and ends the procedure. Otherwise, i.e., the search in the NE service list fails, it indicates that no NE has provided signaling transfer service for the TE, the NE thus searches for service routing, and the procedure goes to step 106.

If the number of the determined neighboring NE in step 105 which has provided signaling transfer service for the TE is at least two, step 105 includes: in accordance with weights of the determined neighboring NEs, selecting the neighboring NE with the largest weight to provide signaling transfer service for the TE, forwarding the register request from the TE to the corresponding SE via the selected neighboring NE, and ending the procedure.

In step 106, the NE searches in a neighboring SE list for an SE which can provide signaling service for the TE. If an SE which can provide signaling service for the TE is searched out, the procedure goes to step 107, i.e., determines the SE which can provide signaling service for the TE as an SE which will provide signaling service for the TE, forwards the register request from the TE to the determined SE and ends the procedure. Otherwise, the procedure goes to step 108.

In step 106, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 107, i.e., forwards the register request from the TE to the determined SE, and ends the procedure. If multiple SEs of all the SEs in the neighboring SE list respond, step 107 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the procedure goes to step 108.

In step 108, the NE searches in a neighboring NE list for a neighboring NE which can provide signaling transfer service for the TE. If a neighboring NE which can provide signaling transfer service for the TE is searched out, the procedure goes to step 109, i.e., determines the neighboring NE which can provide signaling transfer service for the TE as a neighboring NE which will provide signaling transfer service for the TE, forwards the register request from the TE to the corresponding SE via the determined neighboring NE and ends the procedure. Otherwise, the NE ends the search.

In step 108, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 109, i.e., forwards the register request from the TE to the corresponding SE via the determined neighboring NE, i.e., forwards the register request to the NE which responds, and ends the procedure. If multiple NEs of all the NEs in the neighboring NE list respond, step 109 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which has provided signaling transfer service for the TE, and adding the routing information to the NE service list), and ending the procedure.

A second embodiment of the present invention differs from the first embodiment in that, if no neighboring SE which has provided service for the TE is searched out in the recorded SE service list in accordance with the TE ID in the received register request, the NE does not search in the NE service list, but directly searches for service routing in accordance with the neighboring SE list and the neighboring NE list. A specific implementing procedure is as follows.

In step 201, a Terminal Element (TE) sends a register request to a Service Element (SE) via a Network Element (NE).

In step 202, the NE searches in a recorded SE service list for a neighboring SE which has provided signaling service for the TE in accordance with TE ID in the received register request. If a neighboring SE which has provided signaling service for the TE is searched out, the NE determines the neighboring SE which has provided signaling service for the TE as a neighboring SE which will provide signaling service for the TE, goes to step 203, i.e., sends the register request from the TE to the determined neighboring SE, and ends the procedure. Otherwise, the procedure goes to step 204.

If the number of the neighboring SE determined in step 202 is at least two, step 203 includes: in accordance with weights of the determined SEs, selecting the SE with the largest weight to provide signaling service for the TE; forwarding the register request from the TE to the selected SE; and ending the procedure.

In step 204, the NE searches in a neighboring SE list for an SE which can provide signaling service for the TE. If an SE which can provide signaling service for the TE is searched out, the NE determines the SE which has provided signaling service for the TE as an SE which will provide signaling service for the TE, and the procedure goes to step 205, i.e., forwards the register request from the TE to the determined SE, and ends the procedure. Otherwise, the procedure goes to step 206.

In step 204, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 205, i.e., forwards the register request from the TE to the determined SE, and ends the procedure. If multiple SEs of all the SEs in the neighboring SE list respond, step 205 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE has provided signaling service for the TE, and the procedure goes to step 206.

In step 206, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 207. i.e., the NE forwards the register request from the TE to the corresponding SE via the determined neighboring NE and ends the procedure. Otherwise, the NE ends the search.

In step 206, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 207, i.e., forwards the register request from the TE to the corresponding SE via the determined neighboring NE, i.e., forwards the register request to the NE which responds, and ends the procedure. If multiple NEs of all the NEs in the neighboring NE list respond, step 207 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which can provide signaling transfer service for the TE, and adding the routing information to the NE service list), and ending the procedure.

A third embodiment of the present invention differs from the first embodiment in that, the NE does not search in the recorded SE service list for the SE which has provided provide service for the TE, but searches in the recorded NE service list in accordance with the TE ID in the received register request. The NE searches for service routing in accordance with the neighboring SE list and the neighboring NE list if no appropriate NE which has provided signaling transfer service for the TE is searched out. A specific implementing procedure is as follows.

In step 301, a Terminal Element (TE) sends a register request to a Service Element (SE) via a Network Element (NE).

In step 302, the NE searches in a recorded NE service list for a neighboring NE which has provided signaling transfer service for the TE in accordance with TE ID in the received register request. If a neighboring NE which has provided signaling transfer service for the TE is searched out, the NE determines the neighboring NE which has provided signaling transfer service for the TE as a neighboring NE which will provide signaling transfer service for the TE, and goes to step 303, (i.e., the searching in the NE service list fails), it indicates that no NE has provided signaling transfer service for the TE, and the NE needs to search service routing. In this case, the procedure goes to step 304.

In step 303, the NE forwards the register request from the TE to the determined neighboring NE, sends the register request from the TE to the corresponding SE via the determined neighboring NE, and ends the procedure.

If the number of the determined neighboring NE in step 302 which have ever provided signaling transfer service for the TE is at least two, step 303 includes: in accordance with weights of the determined neighboring NEs, selecting the neighboring NE with the largest weight to provide signaling transfer service for the TE; forwarding the register request from the TE to the corresponding SE via the selected neighboring NE, and ending the procedure.

In step 304, the NE searches in a neighboring SE list for an SE which can provide signaling service for the TE. If an SE which can provide signaling service for the TE is searched out, the NE determines the SE which can provide signaling service for the TE as an SE which will provide signaling service for the TE, and the procedure goes to step 305, i.e., forwards the register request from the TE to the determined SE, and ends the procedure. Otherwise, the procedure goes to step 306.

In step 304, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 305, i.e., forwards the register request from the TE to the determined SE, and ends the procedure. If multiple SEs of all the SEs in the neighboring SE list respond, step 305 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the procedure goes to step 306.

In step 306, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 307. i.e., the NE forwards the register request from the TE to the corresponding SE via the determined neighboring NE and ends the procedure. Otherwise, the NE ends the search.

In step 306, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 307, i.e., forwards the register request from the TE to the corresponding SE via the determined neighboring NE, i.e., forwards the register request to the NE which responds, and ends the procedure. If multiple NEs of all the NEs in the neighboring NE list respond, step 307 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which has provided signaling transfer service for the TE, and adding the routing information to the NE service list), and ending the procedure.

A fourth embodiment of the present invention differs from the first embodiment in that, the NE does not search in the recorded SE service list or NE service list for the corresponding SE or NE to provide service for the TE, but directly searches for service routing in accordance with the neighboring SE list and the neighboring NE list. A specific implementing procedure is as follows.

In step 401, a Terminal Element (TE) sends a register request to a Service Element (SE) via a Network Element (NE).

In step 402, the NE searches in a neighboring SE list for an SE which can provide signaling service for the TE. If an SE which can provide signaling service for the TE is searched out, the NE determines the SE which can provide signaling service for the TE as an SE which will provide signaling service for the TE, and the procedure goes to step 403, i.e., forwards the register request from the TE to the determined SE, and ends the procedure. Otherwise, the procedure goes to step 404.

In step 402, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 403, i.e., forwards the register request from the TE to the determined SE, and ends the procedure. If multiple SEs of all the SEs in the neighboring SE list respond, step 403 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the procedure goes to step 404.

In step 404, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 405. i.e., the NE forwards the register request from the TE to the corresponding SE via the determined neighboring NE and ends the procedure. Otherwise, the NE ends the search.

In step 404, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 405, i.e., forwards the register request from the TE to the corresponding SE via the determined neighboring NE, i.e., forwards the register request to the NE which responds, and ends the procedure. If multiple NEs of all the NEs in the neighboring NE list respond, step 405 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which has provided signaling transfer service for the TE, and adding the routing information to the NE service list), and ending the procedure.

A fifth embodiment of the present invention differs from the first embodiment in that, the NE searches for service routing in accordance with only the neighboring SE list. A specific implementing procedure is as follows.

In step 601, a Terminal Element (TE) sends a register request to a Service Element (SE) via a Network Element (NE).

In step 602, the NE searches in a neighboring SE list for an SE which can provide signaling service for the TE. If an SE which can provide signaling service for the TE is searched out, the NE determines the SE which can provide signaling service for the TE as an SE which will provide signaling service for the TE, and the procedure goes to step 603, i.e., forwards the register request from the TE to the determined SE, and ends the procedure. Otherwise, the procedure goes to step 604.

In step 602, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 603, i.e., forwards the register request from the TE to the determined SE, and ends the procedure. If multiple SEs of all the SEs in the neighboring SE list respond, step 603 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the procedure goes to step 604.

A sixth embodiment of the present invention differs from the first embodiment in that, the NE searches for service routing in accordance with only the neighboring NE list. A specific implementing procedure is as follows.

In step 501, a Terminal Element (TE) sends a register request to a Service Element (SE) via a Network Element (NE).

In step 502, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 503. i.e., the NE forwards the register request from the TE to the corresponding SE via the determined neighboring NE and ends the procedure. Otherwise, the NE ends the search.

In step 502, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 503, i.e., forwards the register request from the TE to the corresponding SE via the determined neighboring NE, i.e., forwards the register request to the NE which responds, and ends the procedure. If multiple NEs of all the NEs in the neighboring NE list respond, step 503 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which can provide signaling transfer service for the TE, and adding the routing information to the NE service list), and ending the procedure.

A seventh embodiment of the present invention differs from the first embodiment in that, if no corresponding SE which has provided service for the TE is searched out in the recorded SE service list, the NE does hot search in the NE service list for the corresponding NE which has provided service for the TE, but searches for service routing in accordance with the neighboring SE list. A specific implementing procedure is as follows.

In step 701, a Terminal Element (TE) sends a register request to a Service Element (SE) via a Network Element (NE).

In step 702, the NE searches in a recorded SE service list for a neighboring SE which has provided signaling service for the TE in accordance with TE ID in the received register request. If a neighboring SE which has provided signaling service for the TE is searched out, the NE determines the neighboring SE which has provided signaling service for the TE as a neighboring SE which will provide signaling service for the TE, goes to step 703, i.e., sends the register request from the TE to the determined neighboring SE, and ends the procedure. Otherwise, the procedure goes to step 704.

If the number of the neighboring SE determined in step 702 is at least two, step 703 includes: in accordance with weights of the determined SEs, selecting the SE with the largest weight to provide signaling service for the TE; forwarding the register request from the TE to the selected SE; and ending the procedure.

In step 704, the NE searches in a neighboring SE list for an SE which has provided signaling service for the TE. If an SE which has provided signaling service for the TE is searched out, the NE determines the SE which has provided signaling service for the TE as an SE which will provide signaling service for the TE, and the procedure goes to step 705, i.e., forwards the register request from the TE to the determined SE, and ends the procedure. Otherwise, the NE ends the search.

In step 704, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 705, i.e., forwards the register request from the TE to the determined SE, and ends the procedure. If multiple SEs of all the SEs in the neighboring SE list respond, step 705 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the NE ends the procedure.

An eighth embodiment of the present invention differs from the first embodiment in that, the NE does not search in the recorded SE service list for the corresponding SE which has provided service for the TE, but directly searches in the NE service list for the corresponding NE which has provided service for the TE, and searches for service routing in accordance with the neighboring SE list if no corresponding NE is searched out. A specific implementing procedure is as follows.

In step 801, a Terminal Element (TE) sends a register request to a Service Element (SE) via a Network Element (NE).

In step 802, the NE searches in a recorded NE service list for a neighboring NE which has provided signaling transfer service for the TE in accordance with TE ID in the received register request. If a neighboring NE which has provided signaling transfer service for the TE is searched out, the NE determines the neighboring NE which has provided signaling transfer service for the TE as a neighboring NE which will provide signaling transfer service for the TE, and goes to step 803, otherwise, i.e., the searching in the NE service list fails, it indicates that no NE has provided signaling transfer service for the TE, and the NE needs to search service routing. In this case, the procedure goes to step 804.

In step 803, the NE forwards the register request from the TE to the determined neighboring NE, sends the register request from the TE to the corresponding SE via the determined neighboring NE, and ends the procedure.

If the number of the determined neighboring NE in step 802 which have ever provided signaling transfer service for the TE is at least two, step 803 includes: in accordance with weights of the determined neighboring NEs, selecting the neighboring NE with the largest weight to provide signaling transfer service for the TE; forwarding the register request from the TE to the corresponding SE via the selected neighboring NE, and ending the procedure.

In step 804, the NE searches in a neighboring SE list for an SE which can provide signaling service for the TE. If an SE which can provide signaling service for the TE is searched out, the NE determines the SE which can provide signaling service for the TE as an SE which will provide signaling service for the TE, and the procedure goes to step 805, i.e., forwards the register request from the TE to the determined SE, and ends the procedure. Otherwise, the NE ends the procedure.

In step 804, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 805, i.e., forwards the register request from the TE to the determined SE, and ends the procedure. If multiple SEs of all the SEs in the neighboring SE list respond, step 805 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If one of all the SEs in the neighboring SE list responds, it indicates that no SE can provide signaling service for the TE, and the NE ends the procedure.

A ninth embodiment of the present invention differs from the first embodiment in that, if no corresponding NE is searched out in the NE service list, the NE searches for service routing in accordance with the neighboring SE list. A specific implementing procedure is as follows.

In step 901, a Terminal Element (TE) sends a register request to a Service Element (SE) via a Network Element (NE).

In step 902, the NE searches in a recorded SE service list for a neighboring SE which has provided service for the TE, in accordance with TE ID in the received register request. If a neighboring SE which has provided service for the TE is searched out, the NE determines the neighboring SE which has provided signaling service for the TE as a neighboring SE which will provide signaling service for the TE, and the procedure goes to step 903, i.e., sends the register request from the TE to the determined neighboring SE, and ends the procedure. Otherwise, the procedure goes to step 904.

If the number of the determined neighboring SE in step 902 is at least two, step 903 includes: in accordance with weights of the determined SEs, selecting the SE with the largest weight to provide signaling service for the TE, forwarding the register request from the TE to the selected SE and ending the procedure.

In step 904, the NE searches in the recorded NE service list for a neighboring NE which has provided signaling transfer service for the TE, in accordance with the TE ID in the received register request. If a neighboring NE which has provided signaling transfer service for the TE is searched out, the NE determines the neighboring NE which has provided signaling transfer service for the TE as a neighboring NE which will provide signaling transfer service for the TE, and the procedure goes to step 905. Otherwise, i.e., the search in the NE list fails, it indicates that no NE has provided signaling transfer service for the TE, the NE thus searches for service routing, and the procedure goes to step 906.

In step 905, the NE forwards the register request from the TE to the determined neighboring NE, sends the register request from the TE to the corresponding SE via the determined neighboring NE, and ends the procedure.

If the number of the determined neighboring NE in step 904 which has provided signaling transfer service for the TE is at least two, step 905 includes: in accordance with weights of the determined neighboring NEs, selecting the neighboring NE with the largest weight to provide signaling transfer service for the TE, forwarding the register request from the TE to the corresponding SE via the selected neighboring NE, and ending the procedure.

In step 906, the NE searches in a neighboring SE list for an SE which can provide signaling service for the TE. If an SE which can provide signaling service for the TE is searched out, the NE determines the SE which can provide signaling service for the TE as an SE which will provide signaling service for the TE, and the procedure goes to step 907, i.e., forwards the register request from the TE to the determined SE and ends the procedure. Otherwise, the NE ends the procedure.

In step 906, the NE first sends the register request to all SEs in the neighboring SE list and waits for responses. If one SE of all the SEs in the neighboring SE list responds, it indicates that an SE which can provide signaling service for the TE can be searched out. In this case, the procedure goes to step 907, i.e., forwards the register request from the TE to the determined SE, and ends the procedure. If multiple SEs of all the SEs in the neighboring SE list respond, step 907 includes: in accordance with weights of the determined SEs, selecting the SE with the largest weight to provide signaling service for the TE; forwarding the register request from the TE to the selected SE and adding an item to the SE service list, (i.e., creating routing information between the NE and the determined SE, and adding the routing information to the SE service list), and ending the procedure. If none of all the SEs in the neighboring SE list responds, it indicates that no SE can provide signaling service for the TE, and the NE ends the procedure.

A tenth embodiment of the present invention differs from the first embodiment in that, if no corresponding SE which has provided service for the TE is searched out in the recorded SE service list, the NE does not search in the NE service list for the corresponding NE which has provided service for the TE or search for service routing in accordance with the neighboring SE list, but directly searches for service routing in accordance with the neighboring NE list. A specific implementing procedure is as follows.

In step 1001, a Terminal Element (TE) sends a register request to a Service Element (SE) via a Network Element (NE).

In step 1002, the NE searches in a recorded SE service list for a neighboring SE which has provided service for the TE, in accordance with TE ID in the received register request. If a neighboring SE which has provided service for the TE is searched out, the NE determines the neighboring SE which has provided signaling service for the TE as a neighboring SE which will provide signaling service for the TE, and the procedure goes to step 1003, i.e., sends the register request from the TE to the determined neighboring SE, and ends the procedure. Otherwise, the procedure goes to step 1004.

If the number of the determined neighboring SE in step 1002 is at least two, step 1003 includes: in accordance with weights of the determined SEs, selecting the SE with the largest weight to provide signaling service for the TE, forwarding the register request from the TE to the selected SE and ending the procedure.

In step 1004, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 1005. i.e., the NE forwards the register request from the TE to the corresponding SE via the determined neighboring NE and ends the procedure. Otherwise, the NE ends the search.

In step 1004, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 1005, i.e., forwards the register request from the TE to the corresponding SE via the determined neighboring NE, i.e., forwards the register request to the NE which responds, and ends the procedure. If multiple NEs of all the NEs in the neighboring NE list respond, step 1005 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which can provide signaling transfer service for the TE, and adding the routing information to the NE service list), and ending the procedure.

An eleventh embodiment of the present invention differs from the first embodiment in that, the NE does not search in the recorded SE service list for the corresponding SE which has provided service for the TE, but directly searches in the NE service list for the corresponding NE which has provided service for the TE, and searches for service routing in accordance with the neighboring NE list if no corresponding NE is searched out. A specific implementing procedure is as follows.

In step 1101, a Terminal Element (TE) sends a register request to a Service Element (SE) via a Network Element (NE).

In step 1102, the NE searches in the recorded NE service list for a neighboring NE which has provided signaling transfer service for the TE, in accordance with the TE ID in the received register request. If a neighboring NE which has provided signaling transfer service for the TE is searched out, the NE determines the neighboring NE which has provided signaling transfer service for the TE as a neighboring NE which will provide signaling transfer service for the TE, and the procedure goes to step 1103. Otherwise, i.e., the search in the NE list fails, it indicates that no NE has provided signaling transfer service for the TE, the NE thus searches for service routing, and the procedure goes to step 1104.

In step 1103, the NE forwards the register request from the TE to the determined neighboring NE, sends the register request from the TE to the corresponding SE via the determined neighboring NE, and ends the procedure.

If the number of the determined neighboring NE in step 1102 which has provided signaling transfer service for the TE is at least two, step 1103 includes: in accordance with weights of the determined neighboring NEs, selecting the neighboring NE with the largest weight to provide signaling transfer service for the TE, forwarding the register request from the TE to the corresponding SE via the selected neighboring NE, and ending the procedure.

In step 1104, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 1105. i.e., the NE forwards the register request from the TE to the corresponding SE via the determined neighboring NE and ends the procedure. Otherwise, the NE ends the search.

In step 1104, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 1105, i.e., forwards the register request from the TE to the corresponding SE via the determined neighboring NE, i.e., forwards the register request to the NE which responds, and ends the procedure. If multiple NEs of all the NEs in the neighboring NE list respond, step 1105 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which can provide signaling transfer service for the TE, and adding the routing information to the NE service list), and ending the procedure.

A twelfth embodiment of the present invention differs from the first embodiment in that, if no corresponding NE is searched out in the NE service list, the NE searches for service routing in accordance with the neighboring SE list. A specific implementing procedure is as follows.

In step 1201, a Terminal Element (TE) sends a register request to a Service Element (SE) via a Network Element (NE).

In step 1202, the NE searches in a recorded SE service list for a neighboring SE which has provided service for the TE, in accordance with TE ID in the received register request. If a neighboring SE which has provided service for the TE is searched out, the NE determines the neighboring SE which has provided signaling service for the TE as a neighboring SE which will provide signaling service for the TE, and the procedure goes to step 1203, i.e., sends the register request from the TE to the determined neighboring SE, and ends the procedure. Otherwise, the procedure goes to step 1204.

If the number of the determined neighboring SE in step 1202 is at least two, step 1203 includes: in accordance with weights of the determined SEs, selecting the SE with the largest weight to provide signaling service for the TE, forwarding the register request from the TE to the selected SE and ending the procedure.

In step 1202, the NE searches in the recorded NE service list for a neighboring NE which has provided signaling transfer service for the TE, in accordance with the TE ID in the received register request. If a neighboring NE which has provided signaling transfer service for the TE is searched out, the NE determines the neighboring NE which has provided signaling transfer service for the TE as a neighboring NE which will provide signaling transfer service for the TE, and the procedure goes to step 1205. Otherwise, i.e., the search in the NE list fails, it indicates that no NE has provided signaling transfer service for the TE, the NE thus searches for service routing, and the procedure goes to step 1206.

In step 1205, the NE forwards the register request from the TE to the determined neighboring NE, sends the register request from the TE to the corresponding SE via the determined neighboring NE, and ends the procedure.

If the number of the determined neighboring NE in step 1204 which has provided signaling transfer service for the TE is at least two, step 1205 includes: in accordance with weights of the determined neighboring NEs, selecting the neighboring NE with the largest weight to provide signaling transfer service for the TE, forwarding the register request from the TE to the corresponding SE via the selected neighboring NE, and ending the procedure.

In step 1206, the NE searches in a neighboring NE list for a neighboring NE which can provide signaling transfer service for the TE. If a neighboring NE which can provide signaling transfer service for the TE is searched out, the NE determines the neighboring NE which can provide signaling transfer service for the TE as a neighboring NE which will provide signaling transfer service for the TE, and the procedure goes to step 1207. i.e., the NE forwards the register request from the TE to the corresponding SE via the determined neighboring NE and ends the procedure. Otherwise, the NE ends the search.

In step 1206, the NE sends the register request to all NEs in the neighboring NE list and waits for responses. If one NE of all the NEs in the neighboring NE list responds, it indicates that an NE which can provide signaling service for the TE can be searched out. In this case, the procedure goes to step 1207, i.e., forwards the register request from the TE to the corresponding SE via the determined neighboring NE, i.e., forwards the register request to the NE which responds, and ends the procedure. If multiple NEs of all the NEs in the neighboring NE list respond, step 1207 includes: in accordance with weights of the determined neighboring NEs, selecting the neighboring NE with the largest weight to provide signaling transfer service for the TE; forwarding the register request from the TE to the corresponding SE via the selected neighboring NE and adding an item to the NE service list, (i.e., creating routing information between the TE and the determined neighboring NE which has provided signaling transfer service for the TE, and adding the routing information to the NE service list), and ending the procedure.

It can be seen from the technical solution according to the present invention, a Terminal Element (TE) sends a register request to Service Elements (SEs) via a Network Element (NE); when receiving the register request from the TE, the NE determines one of the SEs which will provide signaling service for the TE in accordance with recorded association information among NE, SE, and/or TE. With the present method, the existing SBC device can support dynamic signaling routing so as to improve the network disaster recovery ability and thereby improve the NGN reliability.

Preferred embodiments of the present invention are described as above. The protective scope of the present invention is not limited to these embodiments. Any variation or substitution within the technical scope of the present invention, which can be easily worked out by those skilled in the art, should be fallen in the protective scope of the present invention as defined in the attached claims.

What is claimed is:

1. A method for implementing dynamic signaling routing, comprising:
   A. receiving, by a Network Element (NE), a register request sent from a Terminal Element (TE); and
   B. upon receiving the register request, determining a Service Element (SE) which will provide signaling service for the TE in accordance with association information recorded in the NE;
   wherein the association information comprises:
      association information between neighboring SEs and the TE for which signaling service is provided, association information between neighboring NEs and the TE for which signaling transfer service is provided, association information between the NE and SEs from which the NE requests signaling service, and association information between the NE and NEs from which the NE requests signaling transfer service;
   wherein the step B comprises:
   B1. searching, by the NE, in the association information between the NE and SEs from which the NE requests signaling service, for the SE which has provided signaling service for the TE; determining the SE which has provided signaling service for the TE as the SE which will provide signaling service for the TE;
   B2. forwarding the register request to the SE which will provide signaling service for the TE; or
   B3. searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring NE which will provide signaling transfer service for the TE;
   B4. forwarding the register request to a SE which has provided signaling service for the TE via the neighboring NE which will provide signaling transfer service for the TE; or
   B5. searching, by the NE, in the association information between the NE and SEs from which the NE requests signaling service, for an SE which has provided signaling service for the TE; determining the SE which has provided signaling service for the TE as an SE which will provide signaling service for the TE, and going to step B6; otherwise, going to step B7;
   B6. forwarding the register request from the TE to the SE which will provide signaling service for the TE;
   B7. searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring NE which will provide signaling transfer service for the TE, and going to step B8; otherwise, ending the search; and
   B8. forwarding the register request from the TE to a SE which has provided signaling service for the TE via the neighboring NE which will provide signaling transfer service for the TE.

2. The method according to claim 1, wherein before the step B1, B3 or B5, the method further comprises:

B01. in accordance with TE ID in the register request, searching, by the NE, in the association information between neighboring SEs and the TE for which signaling service is provided, for a neighboring SE which has provided signaling service for the TE; determining the neighboring SE which has provided signaling service for the TE as a neighboring SE which will provide signaling service for the TE; and going to step B02; otherwise, going to step B1, B3, or B5;

B02. sending the register request to the neighboring SE which will provide signaling service for the TE; or B03. in accordance with TE ID in the register request, searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring NE which will provide signaling transfer service for the TE, and going to step B04; otherwise, going to step B1, B3, or B5;

B04. forwarding the register request to the SE which has provided signaling service for the TE via the neighboring NE which will provide signaling transfer service for the TE; or B05. in accordance with the TE ID in the register request, searching, by the NE, in the association information between neighboring SEs and the TE for which signaling service is provided, for a neighboring SE which has provided signaling service for the TE; determining the neighboring SE which has provided signaling service for the TE as a neighboring SE which will provide signaling service for the TE, and going to step B06; otherwise, going to step B07;

B06. sending the register request to the neighboring SE which will provide signaling service for the TE;

B07. in accordance with TE ID in the register request, searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring SE which will provide signaling service for the TE, and going to step B08; otherwise, going to step B1, B3, or B5;

B08. sending the register request to the SE which has provided signaling service for the TE via the neighboring NE which will provide signaling service for the TE.

3. The method according to claim 2, wherein the step B02 or B06 comprises:

B21. if the number of the SE which has provided signaling service for the TE or the neighboring SE which has provided signaling service for the TE is at least two, selecting the SE with the largest weight to provide signaling service for the TE;

B22. forwarding the register request to the selected SE.

4. The method according to claim 2, wherein, the process of forwarding the register request to the SE which has provided signaling service for the TE via the neighboring NE in the step B04 or B08 comprises:

B41. if the number of the neighboring NE which has provided signaling transfer service for the TE is at least two, selecting the neighboring NE with the largest weight to provide signaling transfer service for the TE;

B42. forwarding the register request to the SE which has provided signaling service for the TE via the selected neighboring NE.

5. The method according to claim 1 wherein the step B2 or B6 comprises:

B21. if the number of the SE which has provided signaling service for the TE or the neighboring SE which has provided signaling service for the TE is at least two, selecting the SE with the largest weight to provide signaling service for the TE;

B22. forwarding the register request to the selected SE.

6. The method according to claim 1, wherein the process of forwarding the register request to the SE which has provided signaling service for the TE via the neighboring NE which will provide signaling transfer service for the TE in the step B4 or B8 comprises:

B41. if the number of the neighboring NE which has provided signaling transfer service for the TE is at least two, selecting the neighboring NE with the largest weight to provide signaling transfer service for the TE;

B42. forwarding the register request to the SE via the selected neighboring NE.

7. The method according to claim 1, wherein in step B2 or B6, the method further comprises:

creating routing information between the NE and the determined SE, and adding the routing information to the association information between the NE and SEs from which the NE request signaling service.

8. The method according to claim 1 wherein in step B4 or B8, further comprises:

creating routing information between the TE and the determined neighboring NE which has provided signaling transfer service for the TE, and adding the routing information to the association information between neighboring NEs and the TE for which signaling transfer service is provided.

9. The method according to claim 1 comprising:

storing the association information between the NE and SEs from which the NE requests signaling service in a neighboring SE list, storing the association information between the NE and NEs from which the NE requests signaling transfer service in a neighboring NE list, storing the association information between neighboring SEs and the TE for which signaling service is provided in an SE service list, and/or storing the association information between neighboring NEs and the TE for which signaling transfer service is provided in an NE service list.

10. The method according to claim 9, wherein between the step A and step B, further comprises:

C1. if the NE detects interruption of the register signaling, deleting routing information of the interruption from the SE service list and/or the NE service list recorded in the NE, and sending the updated list information to the neighboring NEs connected to the NE;

C2. updating, by the neighboring NE, information in SE service list and/or NE service list recorded in the neighboring NE in accordance with the updated list information.

11. The method according to claim 10, wherein the information in the SE service list and/or NE service list recorded in the NE is sent from the NE to the neighboring NEs connected to the NE periodically.

12. A system for implementing dynamic signaling routing, comprising:

Service Elements (SE), for providing signaling service;
Terminal Elements (TE), for sending register requests; and Network Elements (NE), between the TE and the SE, for determining a SE which will provide signaling service for the TE in accordance with association information recorded in the NE upon receiving the register request;

wherein the association information comprises:

association information between neighboring SEs and the TE for which signaling service is provided, association information between neighboring NEs and the TE for which signaling transfer service is provided, association information between the NE and SEs to which the NE requests signaling service, and association information between the NE and NEs from which the NE requests signaling transfer service;

and determining the SE which will provide signaling service for the TE in accordance with the association information recorded in the NE comprises:

- B1. searching, by the NE, in the association information between the NE and SEs from which the NE requests signaling service, for the SE which has provided signaling service for the TE; determining the SE which has provided signaling service for the TE as the SE which will provide signaling service for the TE;
- B2. forwarding the register request to the SE which will provide signaling service for the TE; or
- B3. searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring NE which will provide signaling transfer service for the TE;
- B4. forwarding the register request to a SE which has provided signaling service for the TE via the neighboring NE which will provide signaling transfer service for the TE; or
- B5. searching, by the NE, in the association information between the NE and SEs from which the NE requests signaling service, for an SE which has provided signaling service for the TE; determining the SE which has provided signaling service for the TE as an SE which will provide signaling service for the TE, and going to step B6; otherwise, going to step B7;
- B6. forwarding the register request from the TE to the SE which will provide signaling service for the TE;
- B7. searching, by the NE, in the association information between neighboring NEs and the TE for which signaling transfer service is provided, for a neighboring NE which has provided signaling transfer service for the TE; determining the neighboring NE which has provided signaling transfer service for the TE as a neighboring NE which will provide signaling transfer service for the TE, and going to step B8; otherwise, ending the search;
- B8. forwarding the register request from the TE to a SE which has provided signaling service for the TE via the neighboring NE which will provide signaling transfer service for the TE.

* * * * *